June 17, 1930.  W. H. WINTERS  1,764,817
LOG TURNER
Filed Nov. 20, 1928

Inventor
William H. Winters

By Clarence A. O'Brien
Attorney

Patented June 17, 1930

1,764,817

UNITED STATES PATENT OFFICE

WILLIAM H. WINTERS, OF WILLAMINA, OREGON

LOG TURNER

Application filed November 20, 1928. Serial No. 320,628.

The present invention relates to improvements in log turners and has for its principal object to provide a simple and efficient means for effecting the turning of the log during the sawing operation.

One of the important objects of the present invention is to provide a log turner that includes a vertically movable bar having a series of vertically spaced log engaging teeth carried thereby which teeth effect the turning of the log on its carriage, means being provided for raising and lowering the bar, additional means being provided for clamping the bar in any raised or lowered position against sliding movement.

A further object is to provide a log turner of the above mentioned character that will at all times be positive and efficient in its operation, the same being further simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views thereof:

Figure 1:
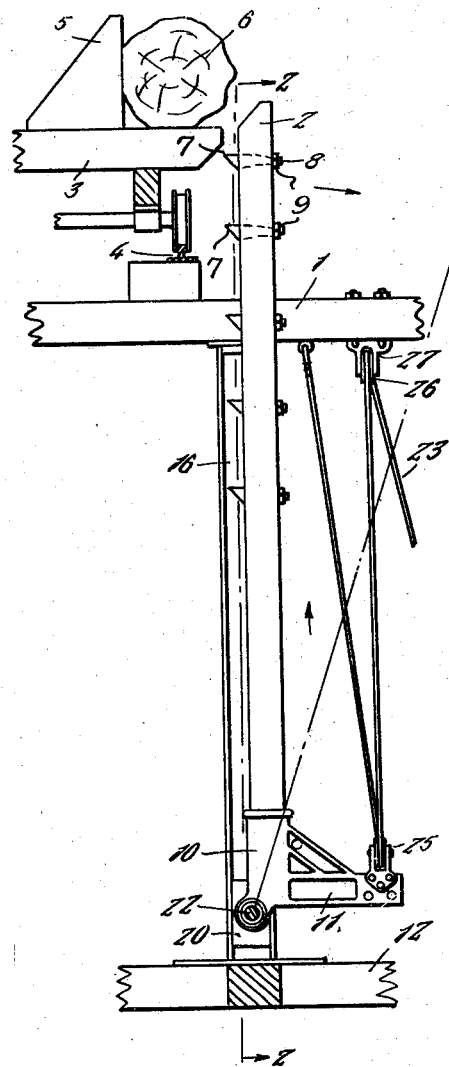
Figure 1 is a side elevation of the log turner embodying my invention.

In the drawings wherein for the purpose of illustration is shown the preferred embodiment of my invention, the numeral 1 designates the floor through which the tooth carrying bar 2 that is of relatively great length is adapted to move. The log carrying carriage is shown at 3 and this carriage is movable along the tracks 4 supported on the floor 1 at one side of the bar 2. A stop 5 is arranged on the platform of the carriage against which the log 6 is disposed in the manner well known in the art.

A series of vertically spaced log engaging teeth 7 project from the inner side of the upper portion of the bar 2, and each tooth is formed with a threaded shank 8 that projects through the opposite side of the bar and has a nut 9 threaded thereon for detachably securing the tooth on the bar.

The lower end of the bar 2 is secured within a suitable socket 10 that is arranged vertically in a triangular shaped casting 11. Arranged on opposite sides of the bar 2 for disposition between the floor 1 and the sub-floor 12 are the channel shaped guides 13 and 14, respectively. A pair of opposed channel shaped members 15 and 16 are attached to the outer face of each of the channeled guides to provide a reinforcing structure therefor. The guide 13 and its reinforcing structure are arranged in a stationary manner between the floor 1 and the sub-floor 12 on one side of the vertically movable bar 2, while the opposed guide unit is pivotally supported at its lower end as at 17 for swinging movement toward or away from the adjacent side of the toothed bar 2. The rod 18 is operatively connected at one end to the upper end portion of the pivotally mounted guide unit, the other end being adapted to be connected to any suitable operating mechanism, not shown, whereby to cause the swinging movement of the pivoted guide unit on a horizontal axis.

Figure 2:
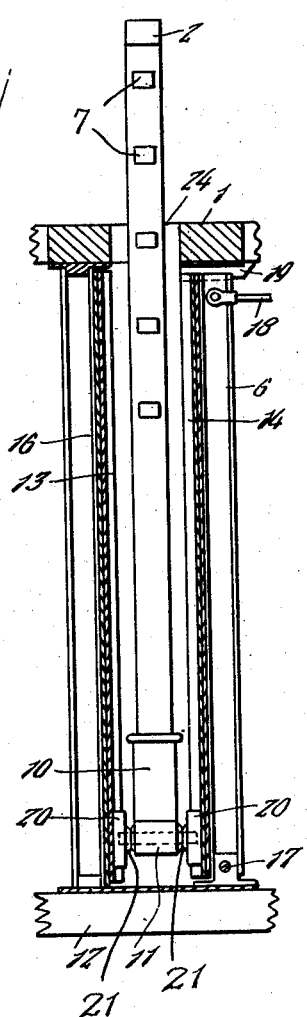
Figure 2 is a vertical sectional view taken approximately on the line 2—2 of Figure 1 looking in the direction of the arrows.
Figure 3:
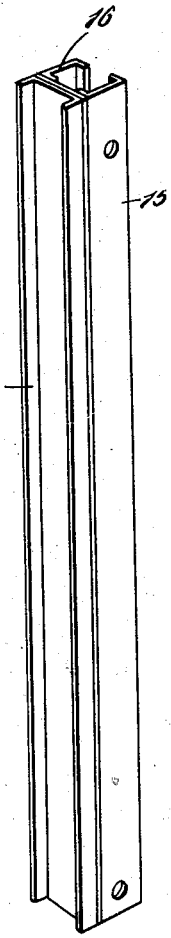
Figure 3 is a detail perspective view of the pivoted guide and clamp unit forming a salient part of the present invention.

As shown in Figure 2, the upper end portion of the pivoted guide unit is operable between angular guide brackets 19 that are attached to the under side of the floor 1.

A pair of rectangular shaped blocks such as are shown at 20 are arranged for longitudinal slidable movement within the respective channeled guides 13 and 14, and as is clearly shown in Figure 2 each block is formed with a boss 21 for receiving the projecting end of a pintle 22 that extends transversely through the apex portion of the triangular shaped casting 11.

The raising and lowering means for the toothed bar comprises a cable 23 that is attached at one end to the under side of the floor 1 on one side of the slot 24 through which the toothed bar is operable. This cable is then trained over a pulley 25 carried by the outer end of the horizontal portion of the triangular shaped casting 11 after which said cable is trained over a pulley 26 secured in a suitable bracket 27 attached to the under side of the floor 1 on the opposite side of the slot 24. The other end of the cable may be connected to the windlass (not shown), and any appropriate means may be provided for winding or unwinding the cable upon its windlass.

Normally the parts are arranged as shown in Figure 1 and the casting with the guide blocks 20 are disposed adjacent the lower ends of the channeled guides. When the cable 23 is actuated to effect an upward pull upon the casting 11, the blocks 20 will move upwardly in the respective channeled guides and the toothed bar 2 will simultaneously be raised causing the vertically spaced teeth 7 to successively engage the log 6 and effect the turning movement thereof on its carriage. The log may be held in any turned position by exerting an inward pressure upon the rod 18 so that a clamping action is set up by the pivoted guide 14 against its adjacent block 20 so that further sliding movement of the toothed bar and the casting carried by the lower end thereof is prevented. However, upon swinging the pivoted guide unit 14 outwardly, to release the clamping action, the blocks 20 are then free to move downwardly in their respective guide channels and the toothed bar will be lowered.

Furthermore, as will be seen when the pivoted guide 14 has been exerted upon so as to effect a clamping action, for maintaining the bar 2 in any vertical position between the guide units, to prevent further raising or lowering of the bar 2, the said bar 2 may be rocked upon its pivotal connection by proper manipulation of the cable 23, to swing either to the right or left as indicated by broken lines in Figure 1, the broken lines therein illustrating the direction of the bar 2 when rocked on its pivot toward the right. However, when the bar 2 is rocked on its pivotal connection toward the left and the teeth engage the log 6 for turning the same, a tight grip of the teeth upon the log will be effected.

Obviously, then, when the bar is rocked toward the left to effect a tight grip of its teeth with the log, and a downward pull is applied to the cable 23, the log is raised, it being understood of course that the guide 14 has been moved upon its pivot a sufficient distance to permit of the raising or lowering of the bar 2, whereas on the other hand, when the guide 14 has had sufficient pressure exerted thereupon through the medium of the rod 18 for clamping the bar 2 stationary between said guide and the other cooperative guide member 13, the bar 2 may then be rocked for movement either toward or away from the log for any purposes.

It will thus be seen from the foregoing description, that I have provided a log turner that will at all times be positive and efficient in its operation and due to its simplicity, the same can be constructed and installed at a very low cost.

While I have shown the preferred embodiment of my invention it is to be understood that minor changes in the size, shape and arrangement of parts may be resorted to without departing from the spirit of the invention or the scope of the appended claims.

Having thus described the invention, what I claim as new and desire to secure by Letters Patent is:—

1. A log turner comprising in combination, a vertically movable bar, vertically spaced log engaging and turning teeth carried by the bar, a pair of vertically arranged guides disposed on opposite sides of the bar, one of the guides being pivotally supported at its lower end, guide blocks carried by the lower end of the toothed bar for cooperation with the respective guides, means for raising and lowering the toothed bar, and means associated with the pivoted guide for setting up a clamping action upon the guide blocks to prevent sliding movement of the toothed bar.

2. A log turner comprising in combination, a vertically movable bar, vertically spaced log engaging and turning teeth carried by the bar, a pair of vertically arranged guides disposed on opposite sides of the bar, one of the guides being pivotally supported at its lower end, guide blocks carried by the lower end of the toothed bar for cooperation with the respective guides, means for raising and lowering the toothed bar, means associated with the pivoted guide for setting up a clamping action to prevent sliding movement of the toothed bar, an operating rod connected with the upper end of the pivoted guide to actuate the same, and an additional guide means for the upper end of the pivoted guide.

3. In a log turner, a vertically movable bar, means for raising and lowering said bar, means for clamping said bar in a raised or lowered position, said last mentioned means including guide means for said bar during the sliding movement of said bar, means for pivotally mounting said movable bar between said guide means, and means to swing said bar upon its pivot for engagement with the log.

4. A log turner comprising, in combination, a pivotally mounted casting, a vertically disposed bar secured at its lower end on the casting, log engaging and turning teeth arranged on the bar at the upper end of said bar, channel guides arranged vertically on opposite sides of said bar, one of said channel guides being pivoted at its lower end, guide blocks pivotally secured to the opposite sides of said casting, said guide blocks being slidably disposed within the respective channel guides, an actuating member connected to the upper end of said pivoted channel guide to set up a clamping action against the adjacent guide block to prevent sliding movement of the casting between the said channel guides, and a common operating mechanism for imparting sliding movement to said casting, and for rocking said casting.

5. In a log turner, a vertically movable bar, log engaging and turning teeth arranged at vertically spaced intervals on the bar, means for raising and lowering the toothed bar, guide means for the vertically movable toothed bar, means for clamping the bar in a raised or lowered position to prevent sliding movement of the bar, means for pivotally mounting said vertically movable bar between said guide means, and said clamping means forming a part of said guide means.

In testimony whereof I affix my signature.

WILLIAM H. WINTERS.